(12) United States Patent
Walden et al.

(10) Patent No.: US 6,617,976 B2
(45) Date of Patent: Sep. 9, 2003

(54) UTILITY METER PIT LID MOUNTED ANTENNA ANTENNA ASSEMBLY AND METHOD

(75) Inventors: Brent Walden, Montgomery, AL (US); Ivan P. DaSilva, Hillsborough, NJ (US)

(73) Assignee: Neptune Technology Group, Inc., Tallasee, AL (US)

( * ) Notice: Subject to any disclaimer, the term of this patent is extended or adjusted under 35 U.S.C. 154(b) by 0 days.

(21) Appl. No.: 09/992,222

(22) Filed: Nov. 19, 2001

(65) Prior Publication Data

US 2002/0089428 A1 Jul. 11, 2002

Related U.S. Application Data

(63) Continuation of application No. 09/145,941, filed on Sep. 2, 1998, now Pat. No. 6,414,605.

(51) Int. Cl.[7] .............................................. G08B 23/00
(52) U.S. Cl. ......................... 340/870.02; 340/870.28; 361/679; 361/659; 343/719; 343/872
(58) Field of Search .................... 340/870.02, 870.03, 340/870.18; 343/719, 872; 361/659, 679

(56) References Cited

U.S. PATENT DOCUMENTS

| | | | |
|---|---|---|---|
| 5,298,894 A | | 3/1994 | Cerny et al. |
| 5,416,475 A | * | 5/1995 | Tolbert et al. ......... 340/870.02 |
| 5,583,492 A | | 12/1996 | Nakanishi et al. |
| 5,617,084 A | * | 4/1997 | Sears ................... 340/870.02 |
| 5,621,419 A | | 4/1997 | Meek et al. |
| 5,659,300 A | | 8/1997 | Dresselhuys et al. |
| 5,825,303 A | | 10/1998 | Bloss, Jr. et al. |
| 5,825,335 A | * | 10/1998 | Arai et al. ................... 343/866 |
| 5,877,703 A | | 3/1999 | Bloss, Jr. et al. |
| 6,072,405 A | | 6/2000 | Sears |
| 6,177,883 B1 | * | 1/2001 | Jennetti et al. ......... 340/870.02 |
| 6,369,769 B1 | * | 4/2002 | Nap et al. .................... 343/719 |
| 6,378,817 B1 | * | 4/2002 | Bublitz et al. .............. 248/200 |
| 6,414,605 B1 | * | 7/2002 | Walden et al. ......... 340/870.02 |

* cited by examiner

Primary Examiner—Michael Horabik
Assistant Examiner—Albert K. Wong
(74) Attorney, Agent, or Firm—David E. Mixon, Esq.; Bradley Arant Rose & White (57) ABSTRACT

Apparatus and methodology for radio utility meter reading processing of data acquisition for use with an automatic billing system involves a utility meter transmitter antenna system installed at or near ground level. An RF utility meter communication apparatus transmits utility meter data to a remote utility meter data collection unit from an underground pit box. The pit box includes a utility meter and has a generally ground level pit lid with an opening therethrough. An antenna element has an upper member extending at least partly through such pit lid opening. A depending base of the antenna element extends from the upper element and passes through the pit lid opening into the underground pit box. The depending antenna element is capacitively coupled or provided with some other form of non-mechanical coupling to the output of an RF transmitter also included within the pit box. The antenna element components are nested for ease of attachment to or removal from a pit lid, with a rotatable threaded nut received about a depending antenna element for drawing tight against the underside of the pit lid, with an upper antenna element received above such pit lid. An antenna element may be directly coupled with a metallic pit lid so that such metallic pit lid functions as part of the antenna. Alternative embodiments may be provided for structure of the antenna element, so as to minimize the structure and components needed for removably securing or installing the antenna arrangement, supported on the removable pit lit of a conventional pit box.

16 Claims, 6 Drawing Sheets

UTILITY METER PIT LID MOUNTED ANTENNA ANTENNA ASSEMBLY AND METHOD

PRIORITY CLAIM

This application is a continuation of Non-Provisional application U.S. Ser. No. 09/145,941, filed Sep. 2, 1998 now U.S. Pat. No. 6,414,605, and priority is hereby claimed therefrom.

BACKGROUND OF THE INVENTION

The present invention relates to radio utility meter reading processing, and is more particularly but not exclusively concerned with a radio transmitter antenna arrangement which is associated with a utility meter, particularly a water meter, for the purpose of transmitting readings of such meter from a generally underground pit box to a remote receiver, and, in part, related methodology.

In conventional practice in the area of utility meter reading for data acquisition and automatic billing, a meter which is intended to be remotely read is installed with a radio transmitter. Such radio transmitter produces radio frequency energy that is coupled to an antenna for broadcasting.

Generally, the nature of such arrangements results in the antenna being placed in an outdoor environment, often at ground level, and in close proximity to a variety of materials and varying weather conditions. Nearby materials may include (and may change from time to time, depending on the environment) items such as metal, plastic, concrete, or organic materials. Weather conditions may involve, from time to time, environmental exposure to ice, snow, water, and temperature extremes (both cold and hot).

The amount of radio frequency energy actually irradiated into the airwaves as compared with that intended to be irradiated is a function of a number of factors. Such factors may include the applied voltage, the amount of current flowing through the antenna, the frequency of the signal applied to the antenna, the material from which the antenna is made, the geometry of such antenna, and the materials that are in a relatively close surrounding space of the antenna (such as within a sphere-radius measuring up to a few wavelengths of the radio signal applied to such antenna). When the surroundings of the antenna vary, the antenna performance (i.e., the degree of the radiated energy therefrom) will also tend to vary correspondingly. The more that adjacent or nearby materials tend to permeate the environment of a particular antenna, the greater the affects on the antenna and its performance, typically to the detriment of such performance.

As is well known, current flow is a function of applied voltage and the equivalent impedance of the system. The equivalent impedance system for an antenna generally is a function of the efficiency of the antenna itself, of the impedance characteristics of the transmission line which is carrying the radio frequency energy from a transmitter to such antenna, and of the geometry of such antenna that presents a particular impedance at given frequencies of operation.

To achieve desired range and reliability of radio frequency communications from pit box generated data, it would be desirable to maintain a controlled and also uniform radio frequency energy irradiation pattern from the antenna used to transmit a radio signal from an enclosed utility meter. One type of antenna conventionally used for utility meter remote transmitting uses a conventional loop antenna design as the irradiator element. Generally speaking, the proximity to the ground which is required for the arrangement results in a deformation in the irradiation pattern produced by the irradiated signal.

Problems encountered with such non-uniform irradiation patterns are further complicated by the fact that irradiated energy may vary from place to place where the antenna is installed. For example, in some antenna systems there may be multiple transmitters that will be sending data to a receiver system, where the transmitter antenna will be installed in cast iron, plastic, or concrete lids of boxes installed underground and with lids thereof generally flush with ground level. Such boxes are commonly called pit boxes in the utility industry, particularly in the water utility industry.

A number of attempts have been made to provide an antenna system that is capable of operating in particular from a water meter pit box environment. However, complete systems for water meters on occasion have been required to be removed from the field for reasons such as poor antenna function, poor range, inconsistent range, and other related problems that also affect the life and/or durability of the effective water meter reading system using a radio frequency transmitter system for data collection.

A number of factors are subject to consideration in providing any successful integrated antenna system. A few of such conditions or factors may include: frequency of operation, transmitter output power, antenna gain, antenna polarization, antenna pattern, azimuth beam-width, azimuth variation, government regulations for operating radio equipment, characteristic antenna impedance, coefficient of maximum wave reflection, antenna geometry, antenna location, ability to effect installation, length of service life desired, ability to operate in exposed environmental conditions such as exposure to water with only very small variation in operation performance due to any water absorption into the antenna system, ultra-violet resistance, shock and vibration resistance, and environmental temperature variability resistance. At the same time, one must be aware of cost factors and the ability to manufacture a large volume of such units (for use in a full system having a number of meter reading locations) with reliability and repeatability of performance.

Examples of several known antenna arrangements for use with utility meter pit boxes are disclosed in Cerny, et al. (U.S. Pat. No. 5,298,894) and Meek, et al. (U.S. Pat. No. 5,621,419). The complete disclosures of such patents are fully incorporated herein by reference.

SUMMARY OF THE INVENTION

The present invention recognizes and addresses various of the foregoing problems, and others, concerning pit box antenna arrangements. Thus, broadly speaking, a principal object of this invention is improved pit box antenna arrangements. More particularly, a main concern is providing improved antenna arrangements for desired quality of utility meter communications even if antenna elements are at least partly exposed to their surrounding environment.

It is another general object of the present invention to provide improved pit box antenna arrangements which have improved range and reliability while still providing an arrangement which may reside close to the ground, for example, to accommodate mowing.

A more particular object is to provide an improved pit box antenna arrangement which functions in conjunction with a pit lid opening, so as to have an antenna element portion at least partly situated above an exterior, above ground portion of the pit box lid for propagating utility meter data from a utility meter within the pit box to a remote utility meter data collection unit.

It is a further more particular object of the present invention to provide such improved antenna arrangements which are operable generally with a variety of utility meter types, such as gas, electric, and water utility meters. It is an additional such object to provide an improved antenna arrangement which may be used in a variety of settings, in conjunction with various transmitters which might be associated with the output of a given utility meter in a given embodiment of a pit box arrangement.

Yet another general object of the present invention is to provide an improved pit box antenna arrangement such that transmitter and antenna features may be coupled together without requiring mechanical coupling. In other words, for example, use of capacitive coupling between transmitter and antenna elements is a specific object for providing improved apparatus and methodology.

Still more particular objects of the present invention relate to providing various components of improved pit box antenna arrangements which may be nestably received with respect to each other. It is a more specific object to provide such components for both improved apparatus and methodology, for improved efficiency during installation and maintenance relative to installing and/or removing such arrangements or parts thereof relative to pit box lids of the type having an opening therethrough.

Yet another more particular object of the present invention is to provide an improved pit box antenna arrangement for use in conjunction with a pit lid opening, such that the top of a radiating antenna element is larger than the opening in the pit lid, to permit such improved arrangement to withstand relatively higher impact loads.

Still another object of the present invention is to provide sealable ends of connections between antenna and transmitter components, for preventing damage to either component from environmental or weather conditions, even when such two components are separated or kept separate through capacitive coupling.

Additional objects of the present invention may be obtained by providing improved pit box antenna arrangements such that the ground plane of the antenna may be external, for allowing a metal pit lid to become an extension of such ground plane. Further objects are obtained by enabling the upper or top radiator element of such improved antenna arrangement to be made of various shapes without adversely affecting radiation of the antenna, such as a curved shape for shedding water.

Additional objects and advantages of the invention are set forth in, or will be apparent to those of ordinary skill in the art from, the detailed description herein. Also, it should be further appreciated that modifications and variations to the specifically illustrated and disclosed features, materials, devices or steps hereof may be practiced in various embodiments and uses of this invention without departing from the spirit and scope thereof, by virtue of present reference thereto. Such variations may include, but are not limited to, substitution of equivalent means, features, materials or steps for those shown or discussed, and the functional or positional reversal of various parts, features, steps or the like.

Still further, it is to be understood that different embodiments, as well as different presently preferred embodiments, of this invention may include various combinations or configurations of presently disclosed features, elements or steps or their equivalents (including combinations of features or steps or configurations thereof not expressly shown in the figures or stated in the detailed description). One exemplary such embodiment of the present invention relates to radio frequency utility meter communication apparatus for transmitting utility meter data to a remote utility meter data collection unit from an underground pit box receiving a utility meter and having a generally ground level pit lid with an opening therethrough.

The foregoing exemplary embodiment of communication apparatus may comprise an antenna element, an RF transmitter, and utility meter interconnection means, all in accordance with the subject invention.

The foregoing exemplary antenna element may have a top cap larger than the pit lid opening and received thereabove. It may further have a depending base extending from such top cap and passing through the pit lid opening into the underground pit box.

The foregoing exemplary RF transmitter may be situated inside the underground pit box and electrically coupled with the antenna element depending base without mechanical connection thereto such that RF signals transmitted by such RF transmitter are propagated by the antenna element. The exemplary utility meter interconnection means are provided for interconnecting data from a utility meter within such underground pit box to the RF transmitter also situated therein.

With the foregoing exemplary arrangement, the antenna element top cap, at least partly situated above an exterior, above ground portion of the pit lid box, propagates utility meter data from the utility meter within the pit box to a remote utility meter data collection unit.

Another present exemplary embodiment concerns an arrangement for obtaining data from a utility meter received in an underground pit box of the type having a lid with a predetermined opening therethrough. Such arrangement preferably comprises transmitter means combined with antenna means, in accordance with the subject invention.

The foregoing exemplary transmitter means are received within such a pit box and interconnected with a utility meter received therein for transmitting utility meter data therefrom. The exemplary such antenna means are preferably capacitively coupled with such transmitter means so as to receive output therefrom without requiring mechanical connection, and extend at least partly through such pit lid predetermined opening. With such an arrangement, the utility meter data advantageously transmitted by such transmitter means are propagated by the antenna means.

In the foregoing exemplary arrangement, such antenna means may alternatively include an upper generally circular member or top cap passed through (i.e., residing above) the predetermined opening of the pit box lid and generally larger than such pit lid opening. It may further include a lower generally straight member (or depending base) extending downwardly from such upper member or top cap so as to extend and pass through the pit box lid opening down into the pit box. In such an arrangement, the antenna means may become at least partly exposed to its surrounding environment.

Further alternatively, in the foregoing exemplary arrangement, part of such antenna means extending through the pit lid predetermined opening may be protectively covered by electromagnetically transparent materials. In still further alternative arrangements of such exemplary embodiment, such antenna means may be directly coupled with a metallic pit lid with which the arrangement is associated so that such metallic pit lid functions as part of the antenna for such transmitter means.

Yet another present exemplary embodiment concerns a radio frequency utility meter communication apparatus for transmitting utility meter data to a remote utility meter data collection unit from an underground pit box receiving a utility meter and having a generally ground level pit lid with an opening therethrough, such communication apparatus comprising in combination a particular antenna element, antenna securement means, an RF transmitter, and utility meter interconnection means, all in accordance with the subject invention.

In the foregoing exemplary embodiment, such antenna element preferably has a top cap larger than the pit lid opening and received thereabove, and has a depending base extending from such top cap and passing through the pit lid opening into the underground pit box.

The foregoing exemplary antenna securement means are preferably provided for securing such antenna element in a fixed position relative to an associated pit lid with such top cap of the antenna element received above the pit lid opening and with the depending base thereof extending through such pit lid opening.

The foregoing exemplary RF transmitter is preferably situated inside the underground pit box and associated with such antenna element depending base such that RF signals transmitted by the RF transmitter are propagated by the antenna element. The exemplary utility meter interconnection means are provided for interconnecting data from a utility meter within an underground pit box to the RF transmitter situated inside such underground pit box. With such an arrangement, the antenna element top cap, at least partially situated above an exterior, above ground portion of the pit box lid, propagates utility meter data from the utility meter within the pit box to a remote utility meter data collection unit.

In a further exemplary embodiment, alternatively, such foregoing exemplary top cap may comprise a separate component joined with a ground plane component forming an upper portion of such depending base. In such exemplary alternative arrangement, the antenna securement means preferably includes radially outward threads carried on an outside diameter portion on the antenna element depending base.

In still another present exemplary embodiment, an arrangement is provided for obtaining data from a utility meter received in an underground pit box of the type having a lid with a predetermined opening therethrough, such arrangement comprising transmitter means and antenna means in accordance with the subject invention.

The foregoing exemplary transmitter means are preferably received within such pit box and interconnected with a utility meter received therein for transmitting utility meter data therefrom. The exemplary foregoing antenna means are preferably electrically coupled with such transmitter means so as to receive output therefrom without requiring mechanical connection thereto. Such antenna means extend at least partly through such pit lid predetermined opening so as to be outside such pit box and at least partly electromagnetically thereabove. With such an arrangement, the utility meter data transmitted by such transmitter means are propagated by the antenna means from outside and above such pit box.

Another present exemplary embodiment concerns an arrangement for obtaining data from a utility meter received in an underground pit box of the type having a lid with a predetermined opening therethrough, such arrangement comprising a particular combination of transmitter means, antenna means, and reversible installation means in accordance with the subject invention.

The foregoing exemplary transmitter means are received within such pit box and interconnected with a utility meter received therein for transmitting utility meter data therefrom. The foregoing exemplary antenna means are preferably associated with such transmitter means and extend at least partly through such pit lid predetermined opening, so that utility meter data transmitted by the transmitter means are propagated by the antenna means.

The foregoing exemplary reversible installation means are provided for removably securing such antenna means relative to the associated pit lid and for removably securing the transmitter means relative to the above-referenced antenna means. With such an arrangement, a data transmission arrangement is removably installed within a utility meter pit box relying only on the pit box lid as a base of support.

In yet another exemplary radio frequency utility meter communication apparatus, an apparatus is provided for transmitting utility meter data to a remote utility meter data collection unit from an underground pit box receiving a utility meter and having a generally ground level pit lid with an opening therethrough. Such communication apparatus comprises an antenna element, an RF transmitter, and utility meter interconnection means in accordance with the subject invention.

Such antenna element preferably has a top cap larger than the pit lid opening and received thereabove. It may further have a depending base extending from such top cap and passing through the pit lid opening into the underground pit box.

The exemplary RF transmitter is situated inside the underground pit box and associated with such antenna element depending base such that RF signals transmitted by the RF transmitter are propagated by the antenna element. Such utility meter interconnection means are provided for interconnecting data from a utility meter within an underground pit box to such RF transmitter situated inside the underground pit box.

With the foregoing exemplary arrangement, the antenna element top cap, at least partly situated above an exterior, above ground portion of the pit box lid, propagates utility meter data from the utility meter within the pit box to a remote utility meter data collection unit.

Lastly, further embodiments of the subject invention preferably relate to corresponding improved pit lid antenna nested mounting arrangements and corresponding methodology for the practice of same. Such nested mounting arrangement preferably provides improved radio transmission of utility meter data from an underground pit box of the type having a removable generally ground level pit lid with a predetermined opening therethrough.

Such exemplary nested mounting arrangement includes a generally elongated antenna element, an antenna main body nesting component, a capture nut, a transmitter housing, and utility meter interconnection means as before.

The foregoing exemplary elongated antenna element is preferably formed so as to reside with a head portion thereof at least partly through an associated pit lid opening and with the remainder thereof depending downwardly into the associated pit box.

The antenna main body nesting component may comprise an elongated generally cylindrical and hollow tubular piece with a relatively enlarged head end corresponding with the antenna element head portion for nesting receipt thereof. Such main body nesting component further defines outside diameter threads, and at least one matable engagement element at an end thereof distal to such head end thereof.

Further provided is a capture nut which is fittable around such threaded outside diameter of the main body nesting component for drawing tight against an underside surface of the associated pit box lid as the relatively enlarged head end of such main body nesting component and as the antenna head portion are caught and drawn tight on the outside of the pit lid through the opening thereof.

The foregoing exemplary transmitter housing is received within the pit box and with a battery operated radio transmitter enclosed therein. Such housing preferably has an antenna coupling post with an open end for telescopically receiving the antenna element depending portion therein capacitively coupled thereto without direct physical contact. Such housing antenna coupling post further has an external matable engagement element adjacent a base portion thereof, complementary to the antenna main body nesting component matable engagement element for selectively locking such antenna coupling post and the transmitter housing to the main body nesting component.

Exemplary embodiments of the present invention include corresponding methodologies for removably installing such a nested pit lid antenna mounting arrangement, wherein the capture nut is selectively fitted around the threaded outside diameter of the main body nesting component for drawing such nut tight against an underside surface of the associated pit box lid, and wherein the antenna coupling post is selectively locked with the transmitter housing to the main body nesting component using the indicated respective engagement elements.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps of the invention.

DETAILED DESCRIPTION OF THE PREFERRED EMBODIMENTS

It is to be understood by those of ordinary skill in the art that the following description is intended by way of example only, and is not intended to limit the broader scope of the subject invention. Likewise, the invention may be practiced in different embodiments, including embodiments different from anything specifically shown in the accompanying figures or explicitly suggested in the subject specification. For example, the subject invention may be practiced in conjunction with transmitting data from a variety of utility meters, such as gas or electric meters, though only a water meter representation is presently illustrated.

Figure 1:
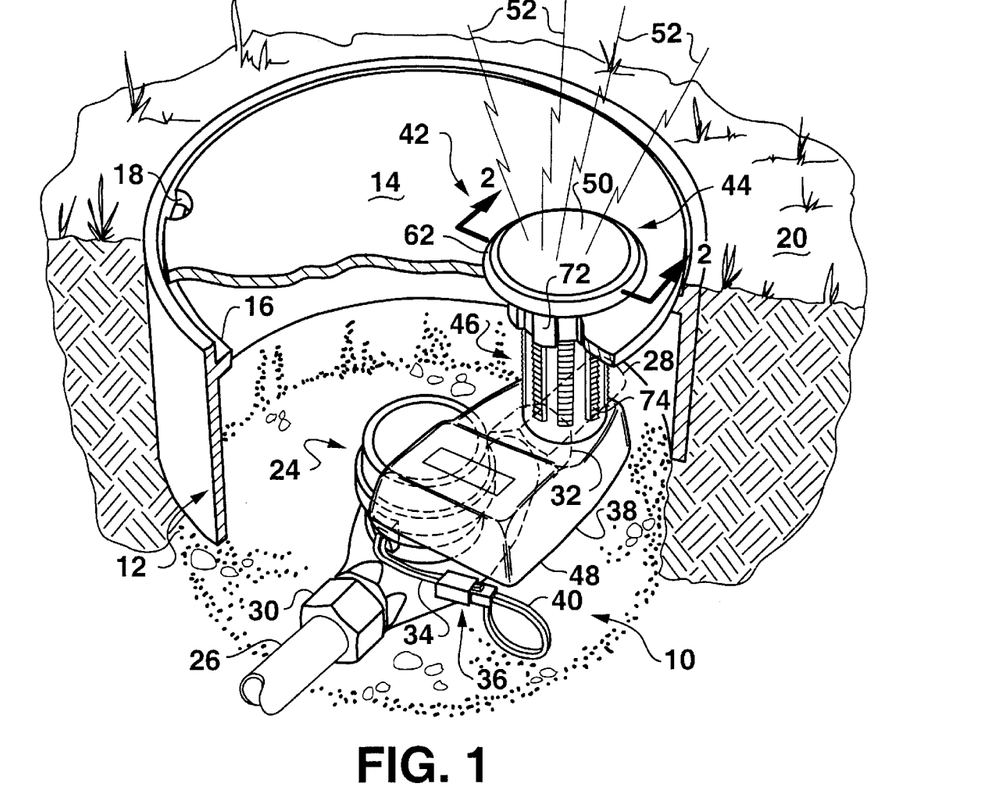
FIG. 1 is a generally perspective view of an exemplary embodiment of the subject invention, shown in partial cutaway of an associated pit box and pit lid and partially in phantom (i.e., transparent) to show use of the exemplary embodiment in its intended environment of an underground pit box and its relationship with the pit lid and pit lid opening thereof.
Figure 2:
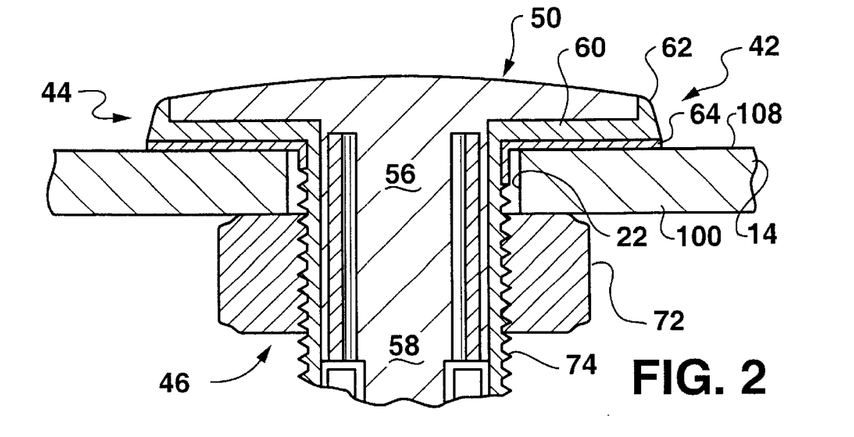
FIG. 2 is an enlarged partial view of the embodiment of present FIG. 1 shown in cross section, taken along the sectional line 2—2 shown in such FIG. 1, and showing in greater detail an exemplary relationship with a pit lid and pit lid opening.
Figure 3:
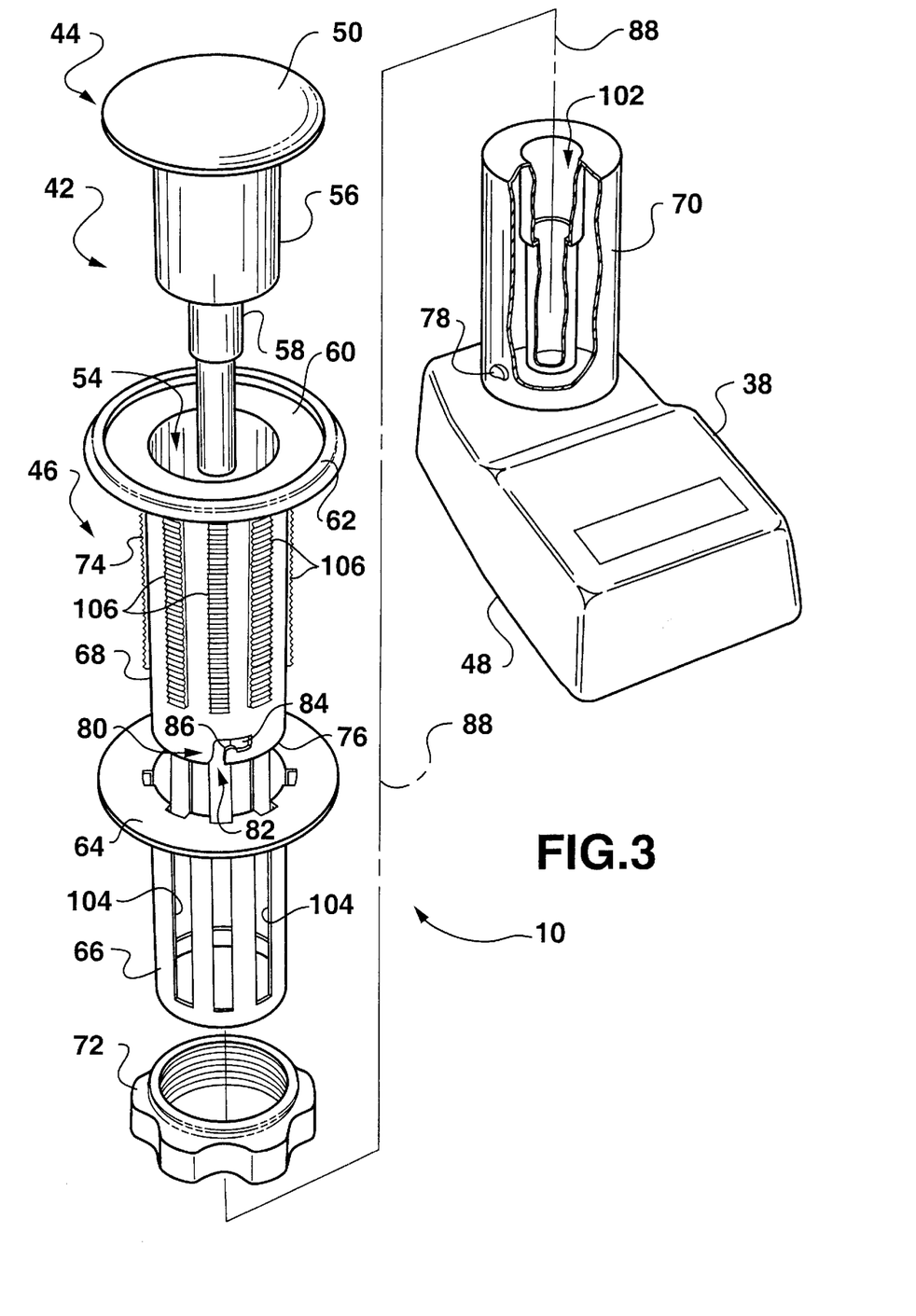
FIG. 3 is an exploded assembly view (with partial cutaway imagery) in isolation of the exemplary embodiment of present FIGS. 1 and 2.

Referring collectively to present FIGS. 1 through 3, an exemplary radio frequency utility meter communication apparatus generally 10 is represented in accordance with the subject invention for use such as with a conventional pit box generally 12 having a removable pit lid generally 14. Such pit box 12 may conventionally comprise various elements such as metal (for example, cast iron), concrete, or plastic. Typically, an internal ledge generally 16 may be provided for support of removable lid 14, with a notch 18 or similar for ease of lid removal.

As represented in the generally perspective view of present FIG. 1 (with partial cutaway illustration of pit box 12 and pit lid 14 and partial phantom illustration of apparatus 10), pit box 12 is primarily underground with its lid 14 generally flush about with upper ground level generally 20. The width or thickness of lid 14 may vary among different installations, but is typically within a thickness range of about 0.5 inches to about 3.0 inches. As referenced in greater detail below, lid 14 is also provided with a generally circular opening 22. The present invention interacts and functions with such opening 22, such as represented in the present isolated and enlarged partial view (in cross section) illustrated by present FIG. 2. The viewpoint of FIG. 2 is taken along the section line 2—2 represented in present FIG. 1.

Returning to present FIG. 1, a representational illustration is provided of a water meter generally 24 residing in-line relative to two sections of water pipe generally 26 and 28. For present purposes, it is not necessary to designate one or the other of such water pipes 26 and 28 as inflow or outflow. It will be well understood by those of ordinary skill in the art that a flow of water will pass in some direction through such pipes 26 and 28 (which may be respectively coupled to water meter 24 with nuts 30 and 32) which flow in turn is measured by water meter 24. Where water meter 24 is replaced by a gas or electric meter, water pipes 26 and 28 are replaced by gas and electric lines, respectively, as understood by those of ordinary skill in the art.

Such water meter 24 is preferably of the type providing meter data for transmission to a remote utility meter data collection unit. Such data may be provided over electrical wires, generally 34, as well understood by those of ordinary skill in the art without requiring additional description.

Utility meter interconnection means generally 36 may be provided for interconnecting data on such lines 34 with an RF transmitter otherwise situated inside such underground pit box 12. In the present exemplary embodiment, such RF transmitter is represented as being enclosed and/or received within a housing body member generally 38 which may be provided for such purpose. The data connection is further realized through additional wires 40. Wires 34 and 40 may comprise shielded wiring or similar.

Those of ordinary skill in the art will appreciate and understand that a variety of utility meter interconnection means may be provided for interconnecting wires 34 and 40. For example, various removable plug arrangements (such as achieved by correspondingly matable male and female plug members) may be provided. Such members may be joined through removable interference fits, or may be joined by other elements (either temporarily or more permanently), such as screws, bayonet mounts, capture nuts, brads, or rivets. All of such variations for providing utility meter interconnection means (whether removable or not) are intended to come within the spirit and scope of the present invention.

The following description references collectively present FIGS. 1 through 3 in greater detail for discussing how RF energy fields produced by RF radio equipment installed with an exemplary utility meter within pit box 12 are relatively directly fed into an antenna arrangement provided in accordance with the subject invention.

FIG. 1 illustrates an overall perspective view of an exemplary arrangement, in relation to the partial cutaway imagery of an exemplary pit box 12 and pit lid 14. FIG. 2 illustrates in greater detail an enlarged and partial view of components of the subject exemplary embodiment of an antenna arrangement cooperating and interacting with pit lid features of a conventional pit box. Such FIG. 2 is taken along a sectional line 2—2 as represented in present FIG. 1. FIG. 3 provides an exploded assembly view (with partial cutaway) of an exemplary embodiment of the subject invention in isolation (i.e., separated from representations of the conventional pit box and pit lid illustrations of present FIG. 1 and the exemplary water meter and water line illustrations also shown in present FIG. 1).

In accordance with this invention, an exemplary radio frequency utility meter communication apparatus generally 10 for transmitting utility meter data to a remote utility meter data collection unit from an underground pit box generally 12 receiving a utility meter generally 24 is positionally and functionally interactive with a generally ground level pit lid 14 with an opening 22 therethrough. Such opening 22 may vary in size, with a diameter of from about 1.5 inches to about 2.0 inches representing a number of typical sizes. The invention may be practiced with various sizes (including other than those mentioned), with sizes of corresponding invention components varied as required or desired, depending on circumstances.

Such an exemplary arrangement has an antenna element generally 42 having an upper member generally 44 extending at least partly through the pit lid opening 22 and received thereabove, and having a depending base generally 46 extending from the upper portion 44 and passing through the pit lid opening 22. Such lower portion 46 therefore passes into the underground pit box 12. At least a portion of antenna element generally 42 in some embodiments in accordance with the subject invention may be exposed to its surrounding environment.

Further concerning such embodiment of the subject invention, an RF transmitter generally 48 is situated preferably inside the underground pit box 12 and associated with the antenna element generally 42 and its depending base generally 46 such that RF signals transmitted by such RF transmitter 48 are propagated by the antenna element generally 42. Complete details of RF transmitters are completely understood by those of ordinary skill in the art and form no particular aspect of the subject invention. Accordingly, it is sufficient for an adequate disclosure of the present invention to understand and appreciate that such RF transmitter subject matter may be received generally within housing 38 in accordance with the subject invention. Exemplary additional details of exemplary RF transmitters are incorporated by reference in view of the incorporation by reference of above-indicated U.S. Pat. Nos. 5,298,894 and 5,621,419.

Referring more specifically to greater details of present FIGS. 1 through 3 collectively, antenna features in accordance with the present invention may include a top metal portion generally 50 of the present exemplary antenna system. Brass is an exemplary metal of which such element 50 may be comprised, for combined features of durability and effective transmission (i.e., irradiation) as an antenna element. Lines 52 of present FIG. 1 are intended to represent such irradiation.

Element 50 is received and assembled into dielectric material generally 54 and in passing through such dielectric material 54 is associated with at least one of the impedance matching components generally 56 and 58. Generally speaking, the techniques for calculating impedance matching values and providing such components are well known to those of ordinary skill in the art and form no particular aspect of the subject invention, wherefore additional details thereof are not required for a complete understanding of the subject invention.

Top metal portion 50 and further antenna ring element generally 60 may have dimensions (such as respective diameters) that may be calculated as a function of the frequency of operation of the system and the nature of the dielectric material present at element generally 62, which calculations are well known to those of ordinary skill in the art without requiring present additional details. Dielectric material generally 62 is also selected so as to provide relatively low radio signal loss, responsive to a large band of operational frequencies. As is apparent from the present illustrations of FIGS. 1 through 3, such dielectric material 62 is formed also so as to provide mechanical support for the antenna generally to operate in outside environmental conditions.

As further represented, top metal portion generally 50 preferably continues in integral fashion so as to further form the component 56. The antenna ground plane generally 64 is assembled under the dielectric material generally 62 and extends to further depending element generally 66 for completion of matching elements in accordance with the subject invention. The space or separation between the top metal portion generally 60 and the antenna ground plane generally 64 is filled with the dielectric material generally 62. These constitute the irradiator element of the present invention antenna system.

Generally speaking, antenna ground plane 64 in at least some embodiments of the subject antenna system provides ground reference allowing the subject antenna to be installed even in pit environmental conditions as referenced generally above. In accordance with at least one exemplary embodiment of the subject invention, top metal portion generally 50, antenna ring generally 60, dielectric material 62, and antenna ground plane generally 64 are components that will be placed outside pit box generally 12 whenever such exemplary subject antenna system for transmitting water meter data is practiced. In such manner, the antenna element top cap 50 is exposed to the environment outside of underground pit box 12. Optionally, in addition, it may be understood that at least part of antenna depending element generally 46 is, or may be, exposed to the environment present within underground pit box 12.

The irradiator element or collective components of the subject antenna system (as composed by top metal portion generally 50, antenna ring generally 60, dielectric material 62, and antenna ground plane 64) are designed to have a low profile relatively close to ground upper surface 20 so as to minimize any obstructions. Such a collective irradiator element will preferably operate with a very low impedance characteristic due to the size of the antenna, and due to the close proximity of antenna ring generally 60 relative to the antenna ground plane generally 64. Such conditions provide for desired operation of the subject invention in the context of application to a pit box 12 environment.

As generally referenced above, an RF or radio signal source such as a transmitter generally 48 provides a radio signal to the irradiator element collectively comprised of features 50, 60, 62, and 64 as referenced above. For most typical applications of the subject invention, a standard output impedance for the radio signal source may be established as 50 ohms. As is well known to those of ordinary skill in the art, in order to prevent or lessen radio signal reflection back to its source, it is preferred to have a matching element that provides the impedance transformation from the radio source output impedance to the low impedance irradiator element described herein. A quarter-wavelength matching element is preferably created once components 56 and 58 are inserted into indicated components 54, 62, and 68, and subsequently such collective group of components 56, 58, 62, and 68 are again further inserted into an antenna ground plane extension portion generally 66.

As will be well understood by those of ordinary skill in the art without further specific description, the diameter of component 56, the wall thickness of component 68 and its corresponding dielectric constant, and the dimensions of the antenna ground plane extension 66 are determinative dimensions for obtaining an appropriate and/or desired matching element for the subject antenna system.

Collectively, in essence, the group of components 50, 56, 58, 60, 62, 68, 64, and 66 as discussed above form the pit antenna irradiator with a built-in matching element that presents a same impedance characteristic as that of the radio source element generally 48. As noted above, impedance matching in any antenna system (or other form of transmission system) is a preferred approach to avoid partial reflection of the radio signal (or other signal being transmitted).

The arrangement of the subject invention preferably results in two main groups of components. As discussed above, components 50, 56, 58, 60, 62, 68, 64, and 66 may be all grouped or regarded together as forming the antenna main body or irradiator element. Accordingly, details of such components, as discussed and illustrated specifically in the specification and appended figures, are important aspects of the present invention. Certain other features concerning the manner of provision of, for example, a battery operated RF utility meter data signal are referenced in additional detail below relative to various embodiments of the subject invention.

As represented by the referenced figures, housing generally 38 may be associated with a further housing component or aspect generally 70. Data lines 40 may lead into housing 38, wherein an RF transmitter generally 48 may receive such data and then output RF signals to the above-described antenna features of the subject invention. As represented by the referenced figures collectively, a capture nut generally 72 may cooperate with outward threads generally 74 for securing the subject antenna arrangement relative to pit lid 14. With such an arrangement, a free or distal end generally 76 of depending element 68 may engage a member or portion generally 78 of upright and telescopically-related housing element 70, for securing housing elements 70 and 38 and their corresponding contents to the arrangement otherwise supported on pit lid 14.

Figure 4:
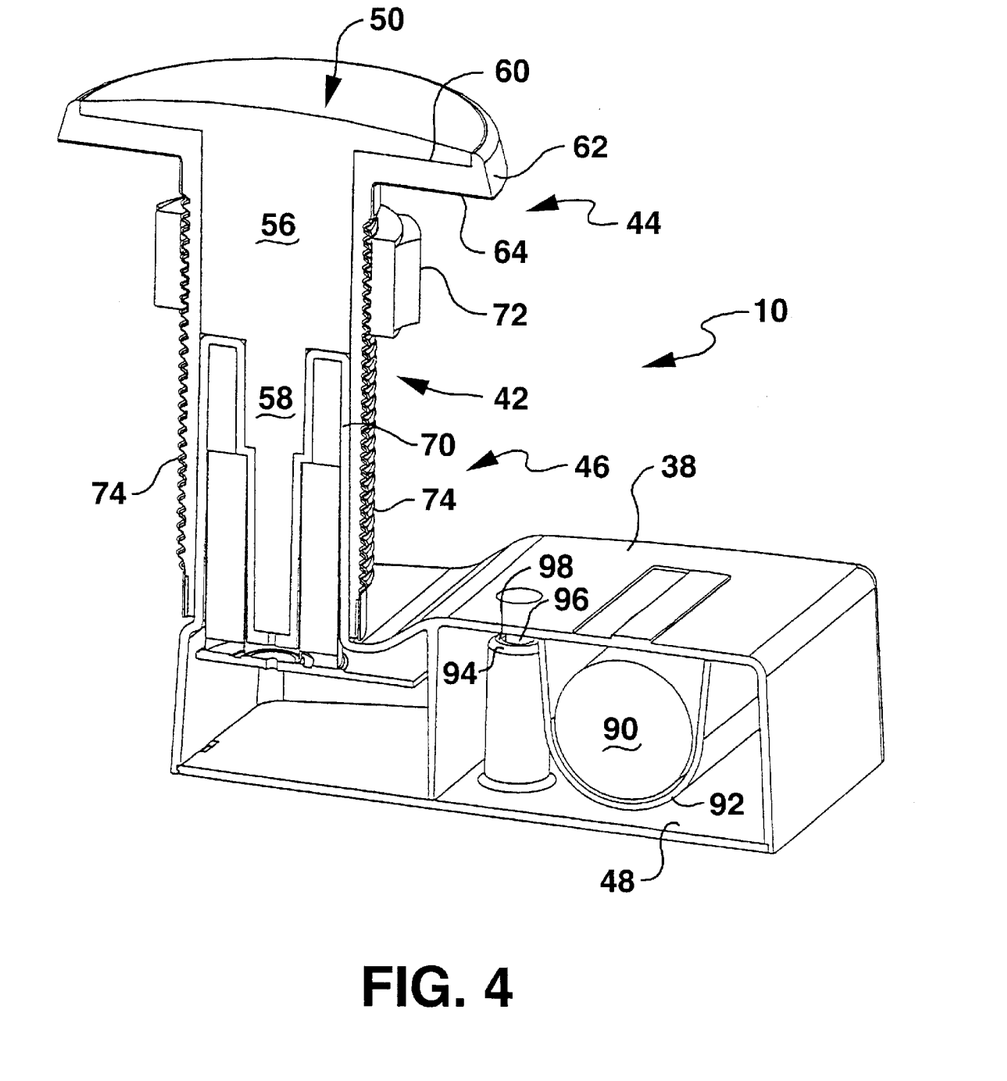
FIG. 4 is an assembly view, in cross section, of the exemplary embodiment of present FIGS. 1 through 3, but in isolation (i.e., without illustrating any of the pit box, pit box lid, utility meter, or utility meter line features)
Figure 5:
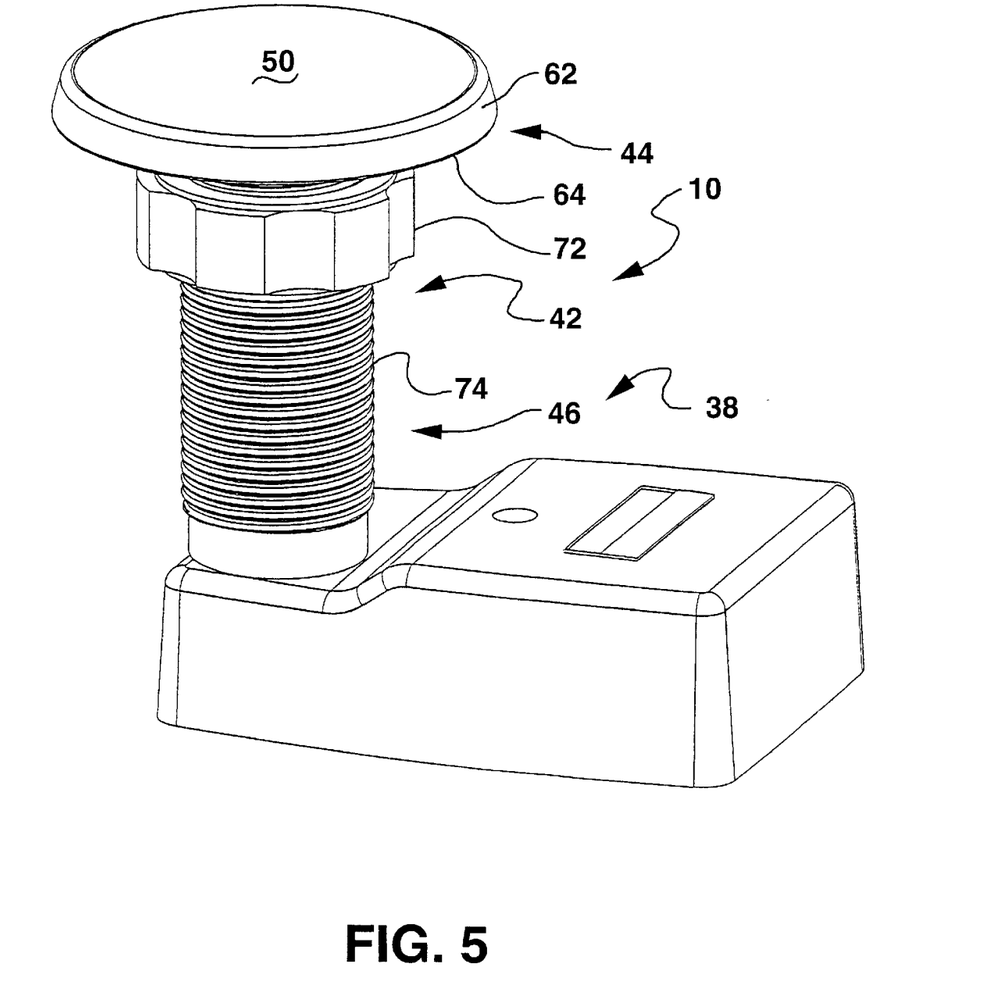
FIG. 5 is an assembly view in perspective of the exemplary embodiment of present FIGS. 1 through 4, showing the assembled, external appearance of such embodiment and visible features thereof, again in isolation, separated from any conventional pit box or pit lid with which such embodiment may be utilized.

FIG. 4 is an assembly view in cross section of the exemplary embodiment of present FIGS. 1 through 3. FIG. 5 is a perspective, assembly view of the same embodiments. Both figures taken together, and especially with FIG. 3, illustrate additional housing component features and other features in accordance with the subject invention.

Specifically, lower housing 38 and upright housing portion 70 combine with the antenna elements 42 and related features for securement to a pit lid, such as through use of locking nut 72. Components received within lower housing element 38 preferably provide a transmitter radio signal source for irradiation, and provide for connection to a utility meter (such as water meter 24). It is to be understood that different arrangements of such components within a lower housing member 38 may be practiced in accordance with the subject invention, the broad indications and representations hereof only comprising one exemplary embodiment of a preferred arrangement.

Various features or components may be practiced for securing the housing components with other features of the present arrangement, so that all such features are collectively supported by the pit lid 14, without having to otherwise rest on any surface or support within pit box 12.

For present exemplary purposes, a projection or member 78 is illustrated adjacent the base of upright housing component 70. A lower end generally 76 of component 68 includes a specific cooperating arrangement generally 80 for interaction with projection 78. Specifically, a generally longitudinal opening 82 leads to a transverse slot generally 84, collectively for passage and receipt of projection 78. An additional projection generally 86 is formed at the junction between longitudinal opening 82 and transverse slot 84.

FIGS. 4 and 5 illustrate an assembly view where the housing components have been situated in place relative to the antenna element and related components. By a rotational or twisting action generally along a lengthwise axis running along the direction of lengthwise portions of joining line 88 (FIG. 3), projection 78 may be received and "locked" into place within transverse slot 84. In such fashion, the housing components are secured to the remaining components of the arrangement. At the same time, the respective antenna and transmitter components are automatically brought into electric connection via function of the remainder of the arrangement, even without requiring mechanical connection between the two. Such electrical connection is accomplished through capacitive coupling, as illustrated by the figures and otherwise referenced in the present specification, all in accordance with certain aspects of the present invention.

Referring in greater detail to cross sectional FIG. 4, a radio signal source element or RF transmitter generally 48 is represented as being received within lower housing component 38, along a bottom portion thereof. RF transmitters are well known to those of ordinary skill in the art without requiring additional details. Such a representation is meant to indicate a radio signal source element such as containing all electronics necessary to control, to process data, and to produce a radio signal that is appropriately coded for passing utility meter data to a remote data collection unit.

Preferably, such RF transmitter generally 48 is battery operated. Component 90 is representative of a battery member which may be practiced. As illustrated, such battery may be held within a sleeve or internal compartment, generally 92, for desired support and positioning thereof.

Interconnection of battery 90 or some other power source with RF transmitter 48 may be provided in a variety of manners, as well understood by those of ordinary skill in the art. For present exemplary purposes, a pair of conductive components, such as metal tubes 94 and 96 may be used, such as with a separating component or electrical separator (i.e., insulator) generally 98 therebetween (see FIG. 4). Component 98, for example, may be made of a plastic material that contains an appropriate dielectric constant desired to be in between the exemplary metal components 94 and 96, to result in a desired impedance. The exact positions and sizes of such parts may be determined for various embodiments by the dimensions and positioning of the components including RF transmitter 48, lower housing member 38 and upright housing projection 70. Such components may be variously waterproofed within housing 38, as desired. Metal components 94 and 96 may be soldered or otherwise connected to RF transmitter 48, in whatever manner as preferred by the user in various embodiments.

FIG. 1 represents the interconnection of wiring 40 with RF transmitter 48, for the application of utility meter data to such RF transmitter 48 for propagation. Electrical connection of the energy field from the RF transmitter may be provided in various ways, for example, by using a transmission line choke joint, well known to those of ordinary skill in the art, such as used for rotary joint radar antennas.

It is to be understood by those of ordinary skill in the art that certain features represented in the figures and as described above constitute reversible installation means in accordance with the subject invention for removably securing the antenna means or elements relative to the associated pit lid and for removably securing the transmitter features relative to such antenna elements. In such fashion, a data transmission arrangement is removably installed within a utility meter pit box relying only on the pit box lid 14 as a base of support.

In part, such reversible installation means includes radially outward threads (such as threads 74) supported on an outside diameter portion associated with the antenna elements and received within the underground pit box generally 12. A cooperating threaded nut generally 72 is then receivable about such radially outward threads 74 so as to be drawn along such threads 74 into contact with a lower side 100 of an associated pit lid 14 (see FIG. 2). It is to be understood by those of ordinary skill in the art that FIGS. 4 and 5 omit representation of pit lid 14, for the sake of clarity. However, FIG. 2 (as well as FIG. 1) fully represents and illustrates the intended relationship with an exemplary pit lid 14.

In the foregoing arrangement, the central support element (or antenna element) includes an upper end generally larger than the associated pit lid predetermined opening 22 (see generally FIGS. 1 and 2) so as to not pass therethrough. In such fashion, the antenna elements situated with or otherwise associated with such central support elements are secured relative to pit box 12 by capture of threaded nut 72 against the pit lid 14.

Still further, such reversible installation means includes a lower end generally 76 of such central support element, defining the engagement features 80, 82, 84, and 86 thereof, as described above. Such engagement members or features interact with the housing, as referenced above, for removably securing the transmitter features relative to the antenna elements. Such detent notch type features are described in detail above with reference to elements 78, 80, 82, 84, and 86 of FIG. 3.

It is to be further understood by those of ordinary skill in the art that the subject invention encompasses and includes a method (and corresponding apparatus) for removably installing a nested pit lid antenna mounting arrangement for improved radio transmission of utility meter data from an underground pit box of the type having a removable generally ground level pit lid with a predetermined opening therethrough. The steps of such methodology (and corresponding apparatus and arrangements for performing same) are discussed further herein.

First involves providing a generally elongated antenna element generally 42 placed so as to reside with a head portion generally 44 thereof at least partly through an associated pit lid opening generally 22 and with a remainder portion thereof generally 46 depending downwardly into the associated pit box 12. Further methodology includes providing an antenna main body nesting component generally 68, comprising an elongated generally cylindrical and hollow tubular piece with a relatively enlarged head end generally 60 corresponding with the antenna element head portion generally 44 and 50, and nesting at least a portion of such antenna element therein (see FIGS. 3 and 4). Additionally, such main body nesting component 68 is provided with outside diameter threads generally 74, and with at least one matable engagement element (generally 80) at an end generally 76 thereof distal to the head end generally 60 thereof.

With the removable pit lid 14 in a raised position, the above referenced antenna element is placed through the opening so that the head portion thereof is received on the upwardly facing side of pit lid 14 and with the depending portion thereof passed through pit lid opening 22. The antenna main body nesting component is similarly situated. Thereafter, a capture nut generally 72 is secured around the threaded outside diameter of main body nesting component 68 and drawn tight against an underside surface generally 100 of the associated pit box lid 14 so that the relatively enlarged head end generally 60 of the main body nesting component and the antenna head portion generally 44 are also caught and drawn tight on the outside of the pit lid 14 through the opening 22 thereof.

Thereafter, a transmitter housing generally 38 with an upright housing component generally 70 are provided within the pit box 12, with an enclosed battery operated radio transmitter 48 therein. The upright coupling post or housing component generally 70 of the transmitter housing has an open end generally 102 (see FIG. 3) into which the antenna element depending portion generally 46 is telescopically placed and capacitively coupled thereto without direct physical contact, as illustrated.

The housing antenna coupling post generally 70 is provided with the external matable engagement element generally 78 adjacent a base portion thereof. Such element 78 is complementary to the antenna main body nesting component matable engagement elements 80, as discussed above. Such respective elements 78 and 80 are selectively locked, so that the antenna coupling post generally 70 and the transmitter housing 38 are likewise selectively locked to the main body nesting component generally 68 using such respective engagement elements.

Thereafter, the utility meter interconnection means generally 36 may be used for establishing a linkage for interconnecting data from a utility meter (such as water meter 24) within the associated pit box 12 to the radio transmitter generally 48 situated in such pit box. In such fashion, the antenna element generally 42 and radio transmitter 48 are removably installed for propagating utility meter data from the utility meter within pit box 12 to a remote utility meter data collection unit.

As further represented in present FIG. 3, ground plane element 64 is included in the above-described arrangement for appropriate securement relative to the remaining antenna elements. In the illustrated embodiment represented by FIG. 3, a depending portion 66 from antenna ground plane 64 includes a plurality of generally longitudinal slots 104. As illustrated, such slots align and cooperate with threads 74, which are defined and formed in longitudinal sections generally 106. In such fashion, the two illustrated elements may be brought telescopically into communication for desired alignment of ground plane 64 and its depending portion 66, but without defeating the function of threaded portions 74.

It should be apparent to those of ordinary skill in the art that removal of part or all of a defective arrangement, or maintenance thereof, once installed relative to a pit lid 14, may be readily achieved by simply reversing the above-indicated steps. Broadly speaking, in other words, the housing components 38 and 70 would be collectively rotated so as to unlatch respective elements 78 and 80. Thereafter, the antenna post 70 could be telescopically withdrawn from the depending elements projecting downwardly underneath pit lid 14. Thereafter, locking nut 72 could be removed so that remaining components could be detached from pit lid 14, if needed. Alternatively, if the only necessary maintenance is related to housing elements 38 and 70, or components therein, the refurbished components could be replaced without requiring the removal of locking nut 72 and the remaining components supported on pit lid 14.

Certain of the above discussed features represent another aspect of the subject invention, that comprise antenna securement means in accordance with the subject invention for securing the antenna element generally 42 in a fixed position relative to an associated pit lid 14 with a top cap generally 50 of such antenna element 42 received above the pit lid opening 22 and with the depending base generally 46 thereof extending through the pit lid opening 22. In the illustrated embodiment, rotatable nut 72 and cooperating threads 74 permit the nut 72 to be drawn tightly against lower surface 100 of pit lid 14, while the portion of the antenna element received outside of the pit box 12 is captured against an upper side generally 108 of such pit lid 14 (see FIG. 2). In at least some preferred embodiments, in such fashion, the antenna element top cap generally 50 may be at least partly exposed to the environment outside of the underground pit box 12.

Where the utility meter interconnection means generally 36 are interconnected with a water meter within the underground pit box (such as exemplary water meter 24), the antenna element top cap generally 50 propagates water meter data to a remote data collection unit.

Additional aspects of the subject invention involve a number of advantages achieved with the overall structure and methodology as shown and described. For example, as illustrated, the antenna elements may be electrically coupled with the transmitter so as to receive output therefrom but without requiring mechanical connection thereto. With such antenna elements extending at least partly through the pit lid predetermined opening 22 so as to be outside pit box 12, they are at least partly electromagnetically thereabove, so that utility meter data transmitted by such transmitter means 48 are advantageously propagated by the antenna elements from outside and above such pit box 12.

Further, with the antenna elements including an upper member generally larger than the predetermined opening 22 of the pit box lid 14 so as to not pass therethrough, and further including a lower member depending downwardly therefrom into pit box 12, a number of advantages are obtained. For example, the overall design allows for the transmitter housing to be larger than the opening 22 through lid 14. At the same time, the antenna element itself can be a larger diameter than the hole 22 through pit lid 14. The transmitter 48 can be wired to the meter (generally 24), and the entire arrangement and unit can be assembled supported from pit lid 14, and received within pit box 12 (except for a portion of the antenna elements outside of pit box 12, as referenced above).

The RF choke or impedance matching elements contained telescopically within and along the length of antenna upright post 70 provide impedance matching between the antenna (preferably about two ohms) and the transmitter (preferably about 50 ohms). Such arrangement of the RF choke allows for a section thereof to be of a relatively constant impedance, electrically providing the appearance or equivalent of, for example, a coax cable. With such an arrangement, the length can be adjusted without affecting the rest of the design. This allows the length to be maximized to allow for pit lids of different thicknesses, such as ranging from 0.5 inches to about 3.0 inches. The longitudinal length of threading 74 and the rotatable position of locking nut 72 thus automatically accommodates such respective different thicknesses, as the remainder of the design electrically accommodates same. At the same time, the telescoping nature of the members indicated protects and seals both the antenna and the transmitter elements, even when such two pieces are separated from one another, thereby preventing damage to either parts from the elements.

Still further, components 50 and 64 (the top metal portion and the antenna ground plane, respectively) of the antenna arrangement are essentially its only conducting elements. Since the subject arrangement does not require the electrical connection with the antenna to be a direct physical connection, such components may be made of a material that oxidizes or has other properties that are not suitable for physical electrical connections. Also, since the antenna element radiates between elements 50 and 64, the top side of upper element 50 of the antenna arrangement can be made basically of any shape without affecting the radiation of the antenna. This could include a slight curved shape (as represented) in order to shed water or deflect other environmental impacts as may occur outside of the shelter of pit box 12.

Aspects and embodiments of the subject invention also include various different combinations of the above-referenced features. For example, one exemplary radio frequency utility meter communication apparatus in accordance with the subject invention might combine an antenna element having a top cap generally 50 larger than the pit lid opening 22 and received thereabove, further combined with an RF transmitter generally 48 situated inside the underground pit box 12 and electrically coupled with a depending base generally 46 of such antenna element without mechanical connection thereto, as referenced above and as shown in the illustrating figures. Such combination may further include utility meter interconnection means such as components 36 for interconnecting data from a utility meter also within the underground pit box 12 to the RF transmitter 48 situated therein.

In the foregoing exemplary embodiments, the antenna means upper and lower elements may be integrally formed, or other approaches may be practiced, as referenced in additional detail below.

Figure 6:
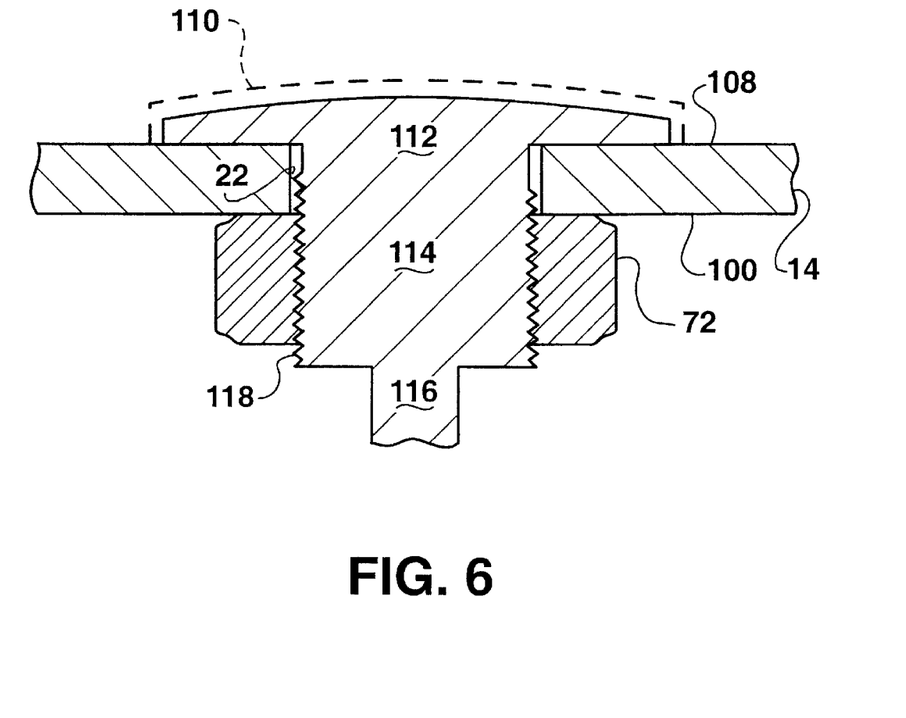
FIG. 6 is an enlarged, partial view in cross section of a second exemplary embodiment in relation to an exemplary pit lid and pit lid opening, similar to the view represented in present FIG. 2.

Still further modifications and variations to the subject invention may be practiced. For example, FIG. 6 represents an enlarged, cross sectional, partial view of exemplary features of a further embodiment in accordance with the subject invention, similar to the view represented in present FIG. 2. Specifically, a capture nut 72 is utilized to secure antenna element features of the subject invention relative to an upper side 108 and lower side 100 of a pit lid 14, and relative to pit lid opening 22. However, other variations are also represented, as follows.

First, FIG. 6 represents in dotted lines 110 that any portion of antenna elements extending through pit lid predetermined opening 22 in accordance with the subject invention may be protectively surrounded by electromagnetically transparent material, such as various plastic coatings or the like. Such feature may be optionally practiced on other embodiments, such as with the arrangement of FIG. 2, and others.

FIG. 6 further represents a present exemplary embodiment wherein an antenna element upper member generally 112 may be integrally formed with lower members thereof generally 114 and 116, with threading 118 received about at least a portion of the outside diameter of lower member 114. Again, such features may be optionally practiced as desired in combination with any of the other remaining features and combinations in accordance with the subject invention.

As still a further optional aspect of the subject invention, it is to be understood that the ground plane generally 64 of the subject invention may be provided externally to the pit box 12. This has a desired optional advantage of allowing a metallic or conductive pit lid 14 to become an extension of such ground plane. In other words, in the exemplary arrangement of present FIG. 6, if a metallic or suitably conductive pit lid 14 is present, the direct coupling of the antenna elements thereto as illustrated permits such pit lid 14 to function as part of the antenna for a corresponding RF transmitter 48.

Figure 7:
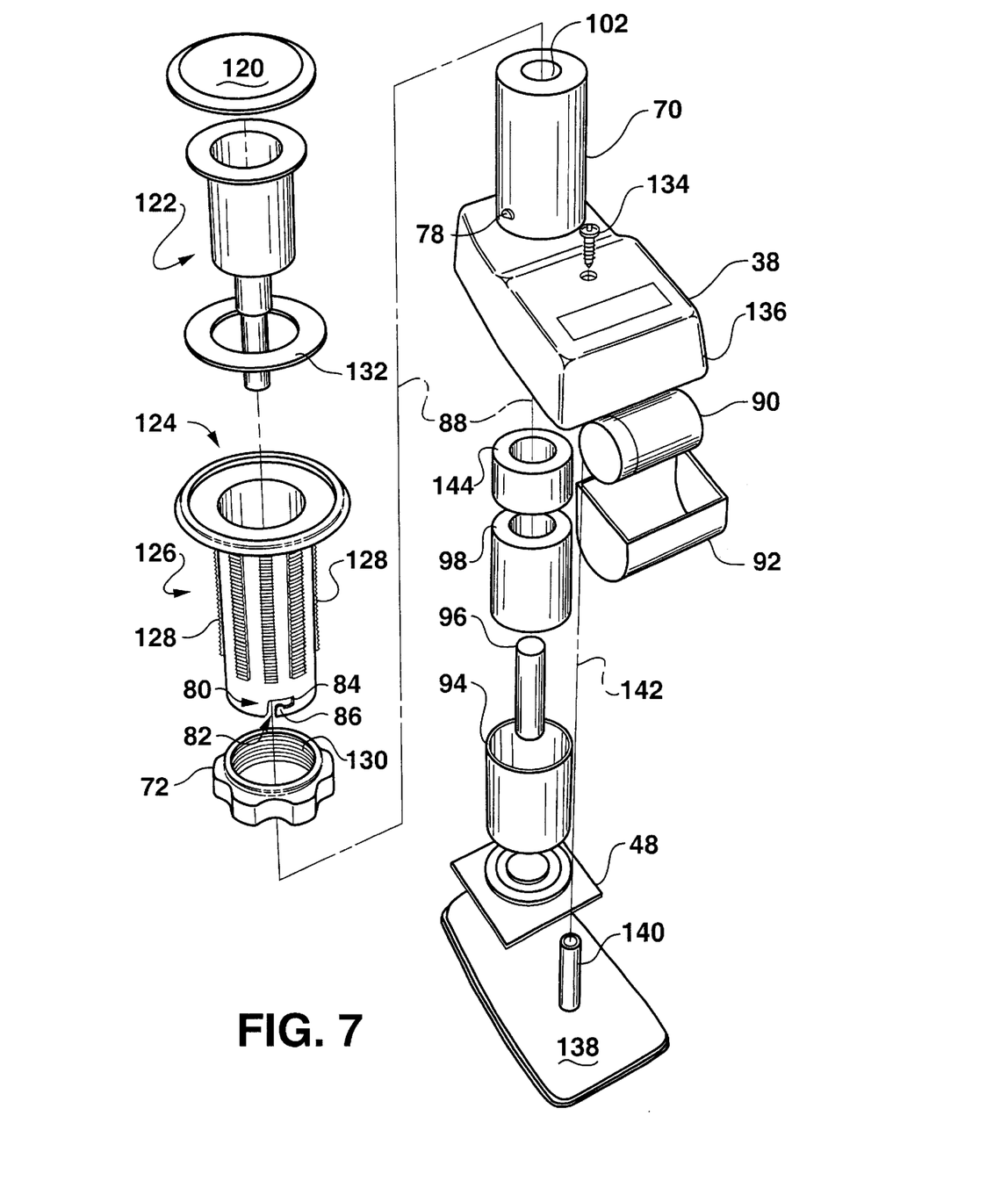
FIG. 7 is an exploded assembly view in isolation of an exemplary third embodiment in accordance with the subject invention, similar to the view represented in present FIG. 3.

FIG. 7 illustrates an exploded assembly view of still a further embodiment of the subject invention, representing certain optional and alternative features thereof. The indicated illustration is similar to the view shown in present FIG. 3. Repeat use of reference characters are intended to continue to represent same or analogous features or elements.

In the exemplary alternative embodiments and features of present FIG. 7, an antenna element may be provided with a top cap 120 generally larger than the pit lid opening 22 and received thereabove, and having a depending base generally 122 extending from such top cap 120 and passing through pit lid opening 22 into an underground pit box 12.

In the arrangement of FIG. 7, a ground plane component generally 124 may be provided with a depending base therefrom generally 126 carrying directly thereon (or included therewith) a plurality of external threads 128 designed for cooperating with the internal threads 130 of locking nut 72.

Antenna element top cap 120 comprises a separate component which becomes joined with the ground plane component 124 with further element 132 received therebetween. In such fashion, insertion of all depending elements through pit lid opening 22 results again in a desired portion of the antenna element being received above and outside pit lid 14, with remaining antenna element structure passing into the interior of pit box 12 and with threaded elements 128 provided for interaction with locking nut 72, as referenced above. Also, telescopic and nestable features as discussed above are provided for cooperating with transmitter coupling post 70, so that elements are aligned and assembled along longitudinal assembly line 88, and the housing components are secured (indirectly) to pit lid 14 due to interaction and cooperation of reversible connection elements 78, 80, 82, 84, and 86 (operative as discussed above with reference to present FIG. 3).

With the foregoing arrangement, the top cap advantageously may comprise a separate component joined with the ground plane component forming an upper portion of a depending base. At the same time, antenna securement means may include radially outward threads carried on an outside diameter portion of such antenna element depending base. This means that the conductive material comprising the antenna ground plane and its depending members may be plated directly onto even the threads 128 of depending member generally 126, instead of requiring a separate jacket (such as respective elements 66 and 68 of present FIG. 3).

Also as represented in present FIG. 7, a screw element or similar 134 may be provided for removably securing an upper portion or section 136 with a base portion or section generally 138 comprising housing component 38. In the illustrated example, an upright post generally 140 with internal threading (not seen) may be provided for receipt of screw element 134, assembled along the indicated assembly line 142 of present FIG. 7. In providing the details of any such assembly arrangement, additional insulators or spacer elements, such as component 144, may be provided as needed for creating proper support and/or electrical connections.

Those of ordinary skill in the art may practice various modifications to the subject invention during use thereof, without departing from its basic spirit and scope. For example, various disclosed features may be provided in different combinations, such that some embodiments will not make use of all features disclosed herein while other embodiments have different combinations of such features than utilized in some embodiments, all in accordance with the subject invention. Likewise, corresponding methodologies may be varied to accommodate such variations in the use of different structural arrangements.

Still further, various substitutions of different materials may be practiced. For example, a pit box 12 and/or pit lid 14 with which the subject invention may be practiced may be comprised of various substances, including metal substances (such as cast iron or other), concrete materials and similar, or plastic materials.

Likewise, materials of the subject invention may be varied so as to make use of functional equivalents. For example, conductive components of the antenna elements may at least partly comprise a metallic substance. One exemplary preferred embodiment of such metallic substance comprises copper. Another exemplary preferred metallic substance is nickel.

Plating could also be used, in place of stampings. For example, parts could be plated with either copper or nickel.

For stampings, copper, stainless steel, or aluminum could be utilized. In certain embodiments, copper or nickel foil might be deposited on the threads.

At the same time, other variations may be practiced in accordance with the invention, so that conductive materials generally (such as conductive plastics) are utilized, rather than being limited strictly to use of a metallic substance. A partial listing of materials, collectively involving all of the foregoing arrangements and alternatives, could include copper, stainless steel, aluminum, copper or nickel plating, nickel chromium, conductive plastics, foil or deposited layers, carbon used as a filler in a polymer material, carbon used in a liquid similar to ink that could be painted onto an otherwise non-conductive material, plastics with added conductive fillers, such as carbon black, carbon fiber, graphite fiber, stainless steel fiber, aluminum fiber, and metal coated inorganic additives such as silver coated glass beads or fibers, gold, silver, polymers that have a high dielectric constant, and various alloys such as copper alloys, including brass and its variations, and ferrous alloys.

Further variations and modifications to the subject invention may be practiced without departing from the spirit and scope thereof. Specifically, it should be further understood by those of ordinary skill in the art that the foregoing presently preferred embodiment is exemplary only, and that the attendant description thereof is likewise by way of words of example rather than words of limitation and their use does not preclude inclusion of such modifications, variations, and/or additions to the present invention as would be readily apparent to one of ordinary skill in the art, the scope of the present invention being set forth in the appended claims.

What is claimed is:

1. A radio frequency utility meter communication apparatus for transmitting utility meter data to a remote utility meter data collection unit from an underground pit box receiving a utility meter and having a generally ground level pit lid with an opening therethrough, said communication apparatus comprising:
   an antenna element having a top cap larger than the pit lid opening and received thereabove, and having a depending base extending from said top cap and passing through the pit lid opening into the underground pit box, wherein said top cap comprises a separate component joined with a ground plane component forming an upper portion of said depending base;
   antenna securement means for securing said antenna element in a fixed position relative to an associated pit lid with said top cap of said antenna element received above the pit lid opening and with said depending base thereof extending through said pit opening, wherein said antenna securement means includes radially outward threads carried on an outside diameter portion on said antenna element depending base;
   an RF transmitter situated inside the underground pit box and associated with said antenna element depending base such that RF signals transmitted by said RF transmitter are propagated by said antenna element; and
   utility meter interconnection means for interconnecting data from a utility meter with an underground pit box to said RF transmitter situated inside such underground pit box;
   whereby said antenna element top cap, at least partly situated above an exterior, above ground portion of the pit box lid, propagates utility meter data from the utility meter within the pit box to a remote utility meter data collection unit.

2. An arrangement for obtaining data from a utility meter received in an underground pit box of the type having a lid with a predetermined opening therethrough, said arrangement comprising:
   transmitter means received within such a pit box and interconnected with a utility meter received therein for transmitting utility meter data therefrom wherein said transmitter means includes a battery operated transmitter and a battery therefore received within a battery housing supportively associated with said antenna means within the pit box; and
   antenna means, capacitively coupled with said transmitter means so as to receive output therefrom without requiring mechanical connection thereto, and extending at least partly through such pit lid predetermined opening, so that utility meter data transmitted by said transmitter means are propagated by said antenna means.

3. An arrangement for obtaining data from a utility meter received in an underground pit box of the type having a lid with a predetermined opening therethrough, said arrangement comprising:
   transmitter means received within such a pit box and interconnected with a utility meter received therein for transmitting utility meter data therefrom; and
   antenna means, capacitively coupled with said transmitter means so as to receive output therefrom without requiring mechanical connection thereto, and extending at least partly through such pit lid predetermined opening, so that utility meter data transmitted by said transmitter means are propagated by said antenna means, wherein said transmitter means and said antenna means respectively include telescopic connection means for capacitively coupling respective antenna and transmitter components telescopically mutually related.

4. An arrangement for obtaining data from a utility meter received in an underground pit box of the type having a lid with a predetermined opening therethrough, said arrangement comprising:
   transmitter means received with such a pit box and interconnected with a utility meter received therein for transmitting utility meter data therefrom; and
   antenna means, associated with said transmitter means, and extending at least partly through such pit lid predetermined opening, so that utility meter data transmitted by said transmitter means are propagated by said antenna means; and
   reversible installation means for removably securing said antenna means relative to the associated pit lid and for removably securing said transmitter means relative to said antenna means, so that a data transmission arrangement is removably installed within a utility meter pit box relying only on the pit box lid as a base of support.

5. An arrangement as in claim 4, wherein said part of said antenna means extending through said pit lid predetermined opening is protectively covered by electromagnetically transparent materials.

6. An arrangement as in claim 4, wherein said antenna means includes an upper member externally exposed and generally larger than the predetermined opening of the pit box lid so as to not pass through such pit lid while being exposed thereabove, and further wherein said antenna means includes a lower member depending downwardly from said upper member so as to extend and pass through the pit box opening down into the pit box.

7. An arrangement as in claim 4, wherein said antenna means upper and lower members are integrally formed of conductive materials.

8. An arrangement as in claim 7, wherein said conductive materials at least partly comprise nickel.

9. An arrangement as in claim 4, wherein said transmitter means includes a battery operated transmitter and a battery therefore received within a battery housing supported within the pit box.

10. An arrangement as in claim 4, wherein said reversible installation means includes:

a central generally cylindrical and hollow support element having outside diameter threads;

a cooperating threaded nut receivable about said central support element so as to be drawn along said threads thereof into contact with the lower side of the associated pit lid; and wherein said central support element includes an upper end generally larger that the associated pit lid predetermined opening so as to not pass therethrough, such that an associated antenna means situated within said central support element through said upper end thereof is secured relative to the pit lid by capture of said threaded nut against such pit lid.

11. An arrangement as in claim 10, wherein said central support element further includes a lower end thereof generally opposite said upper end thereof and defining at least one engagement member for interaction with said transmitter means for removably securing same relative to said antenna means.

12. An arrangement as in claim 11, wherein said at least one engagement member comprises a detente notch, and wherein said transmitter means includes a projecting member for being removably engaged with said detente notch.

13. An arrangement as in claim 10, wherein said antenna means are capacitively coupled with said transmitter means without direct physical connection therewith, so as to facilitate function of said reversible installation means.

14. An arrangement as in claim 4, wherein said reversible installation means comprises:

radially outward threads supported on an outside diameter portion of said antenna means received within the underground pit box; and a cooperating threaded nut receivable about said radially outward threads so as to be drawn along said threads into contact with the lower side of the associated pit lid.

15. An arrangement as in claim 10, wherein said antenna means are directly coupled with a metallic pit lid with which said arrangement is associated so that such metallic pit lid functions as part of the antenna for said transmitter means.

16. An arrangement as in claim 10, wherein said antenna means are at least partly exposed to the surrounding environment.

* * * * *